(12) United States Patent
D'Angelo et al.

(10) Patent No.: US 11,681,144 B1
(45) Date of Patent: Jun. 20, 2023

(54) METHOD, SYSTEM, AND APPARATUS FOR MIXED REALITY

(71) Applicant: D'Angelo Technologies, LLC, Harmony, PA (US)

(72) Inventors: Maurissa Suzanne D'Angelo, Harmony, PA (US); Nicholas Braniff, Cranberry Township, PA (US)

(\*) Notice: Subject to any disclaimer, the term of this patent is extended or adjusted under 35 U.S.C. 154(b) by 0 days.

(21) Appl. No.: 17/176,046

(22) Filed: Feb. 15, 2021

(51) Int. Cl.
 *G02B 27/01* (2006.01)
 *H04N 13/332* (2018.01)
 *G06T 5/00* (2006.01)
 *G06T 7/11* (2017.01)

(52) U.S. Cl.
 CPC ............ *G02B 27/017* (2013.01); *G06T 5/001* (2013.01); *G06T 7/11* (2017.01); *H04N 13/332* (2018.05); *G06T 2207/20132* (2013.01)

(58) Field of Classification Search
 CPC ......... G02B 27/017; G06T 7/11; G06T 5/001; G06T 2207/20132; H04N 13/332
 See application file for complete search history.

(56) References Cited

U.S. PATENT DOCUMENTS

| | | | | |
|---|---|---|---|---|
| 2010/0020160 A1\* | 1/2010 | Ashbey | ............... | H04N 13/261 348/E13.001 |
| 2010/0066815 A1\* | 3/2010 | Allen | ................... | H04N 13/221 348/E13.074 |
| 2011/0119801 A1\* | 5/2011 | Wright | ................... | B23K 9/322 2/9 |
| 2011/0179541 A1\* | 7/2011 | Wright | ................... | A61F 9/061 2/427 |
| 2013/0206741 A1\* | 8/2013 | Pfeifer | ................... | G01S 11/14 356/28 |
| 2015/0154884 A1\* | 6/2015 | Salsich | ............... | B23K 9/0953 434/234 |
| 2015/0190875 A1\* | 7/2015 | Becker | ................... | G09B 19/24 434/234 |
| 2016/0107258 A1\* | 4/2016 | Denis | .................. | B23K 9/0956 2/8.2 |
| 2016/0125653 A1\* | 5/2016 | Denis | ...................... | G06F 3/167 348/90 |
| 2017/0227644 A1\* | 8/2017 | Boillot | ...................... | G01S 17/48 |
| 2018/0088890 A1\* | 3/2018 | Pohl | ........................ | G06F 3/147 |
| 2020/0397615 A1\* | 12/2020 | Williams | ................ | A61F 9/065 |
| 2021/0016382 A1\* | 1/2021 | Pfeifer | ................... | B23K 9/095 |
| 2021/0158716 A1\* | 5/2021 | Becker | ................... | G09B 19/24 |
| 2021/0158717 A1\* | 5/2021 | Becker | ...................... | G09B 9/00 |
| 2021/0158724 A1\* | 5/2021 | Becker | ................. | B23K 9/0956 |

\* cited by examiner

*Primary Examiner* — Dmitriy Bolotin

(57) ABSTRACT

A method system an apparatus to convert an image to a pseudo-stereoscopic image comprising receiving an image through a video source, duplicating the captured image, cropping the captured image and the duplicated image by applying an offset to the images, outputting the images to a display be displayed to a user in a manner such that user perceives depth in the images due to the applied offset and displaying the images on a stereoscopic display.

19 Claims, 17 Drawing Sheets

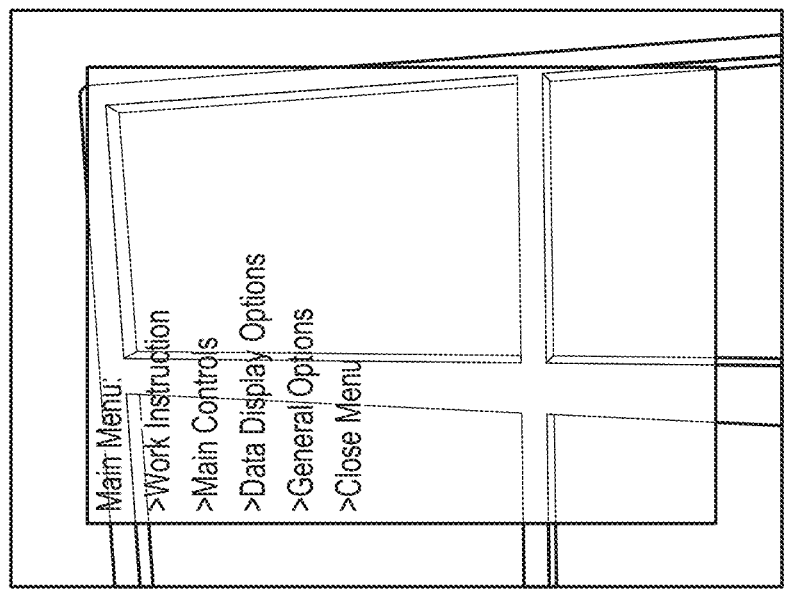
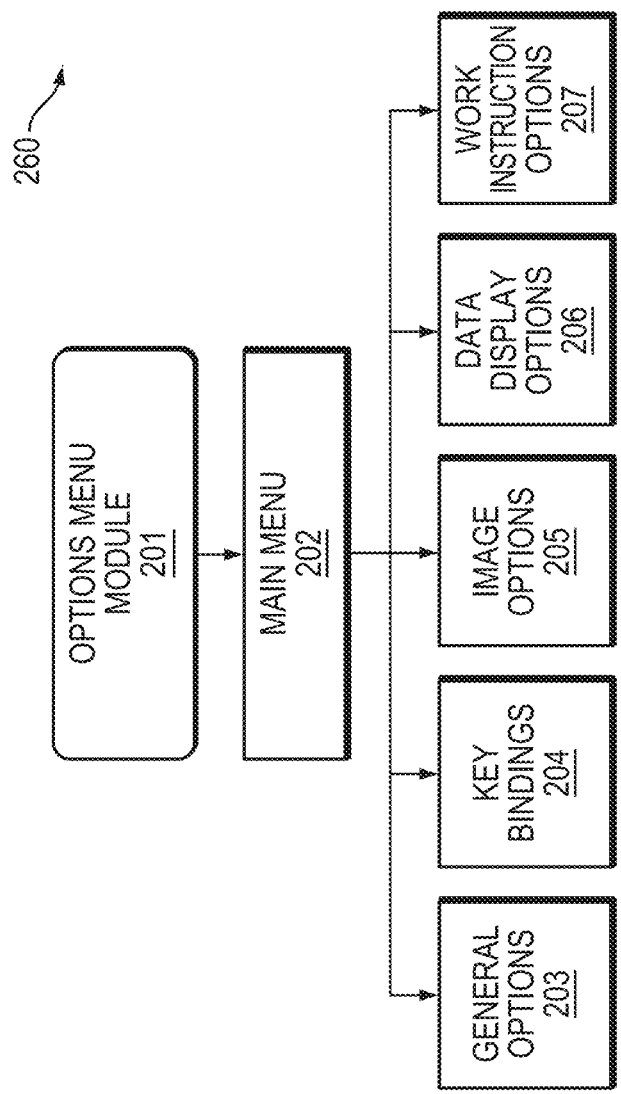
FIG. 2A

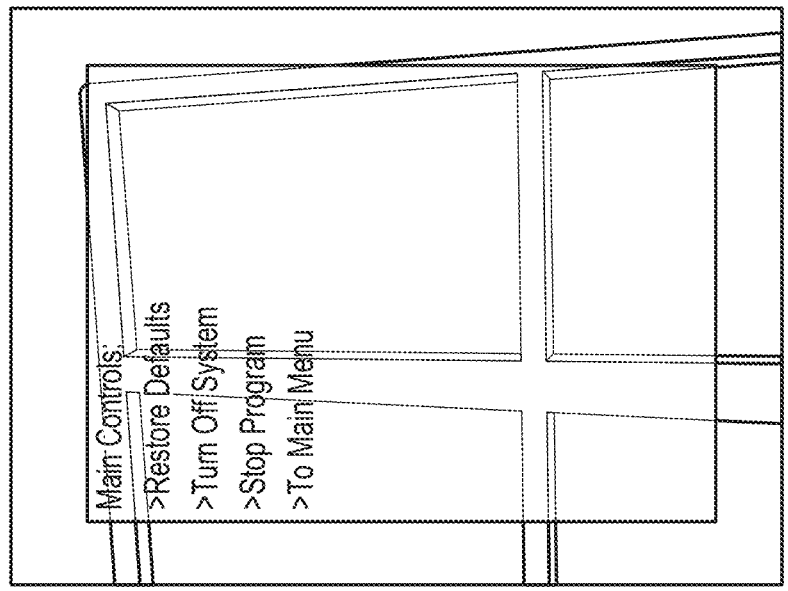
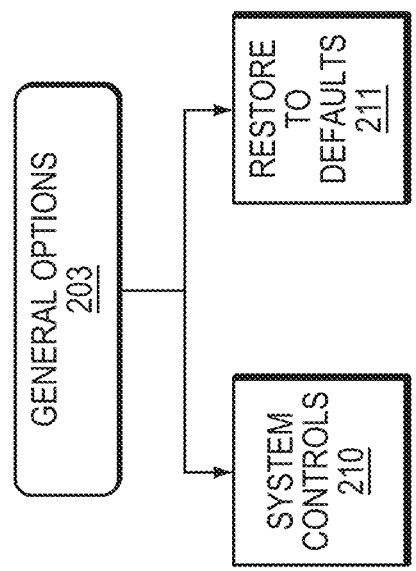
FIG. 2B

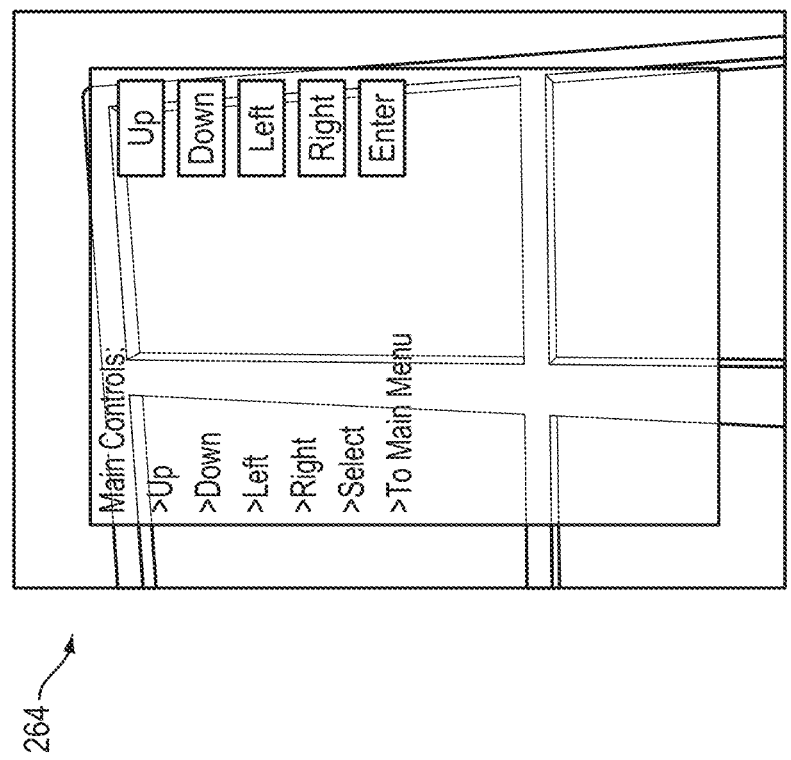
264
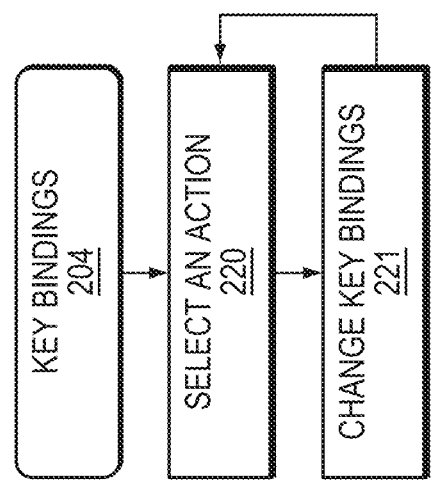
FIG. 2C

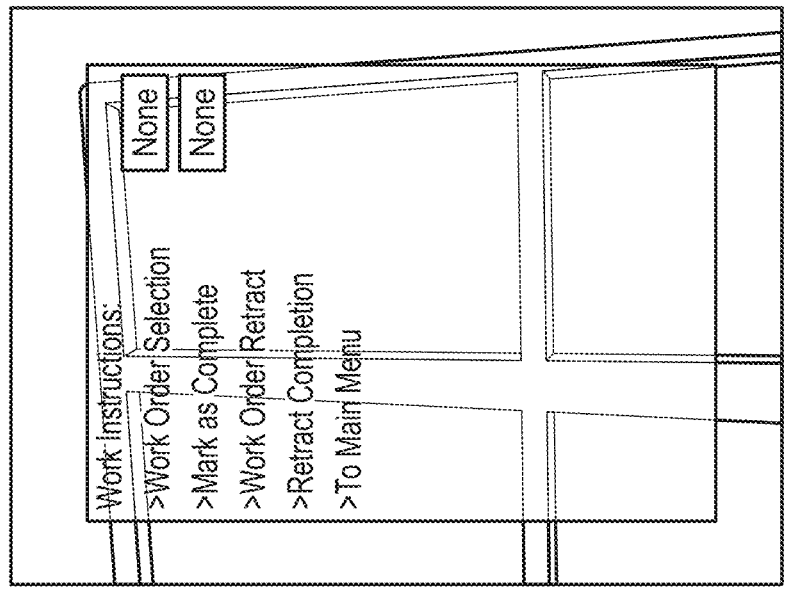
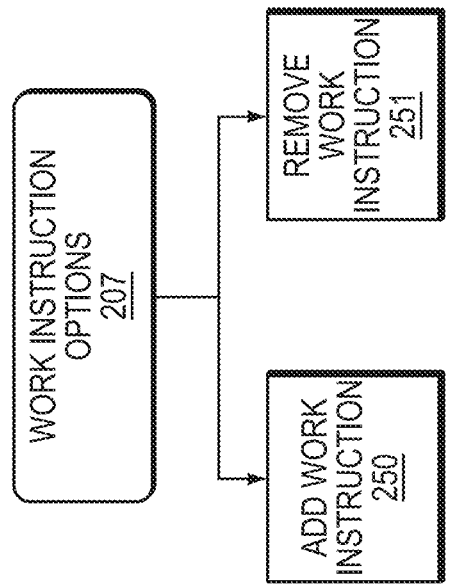
FIG. 2F

WHAT THE SCREEN LOOKS LIKE

USING LENSES, USER SEES ONE IMAGE

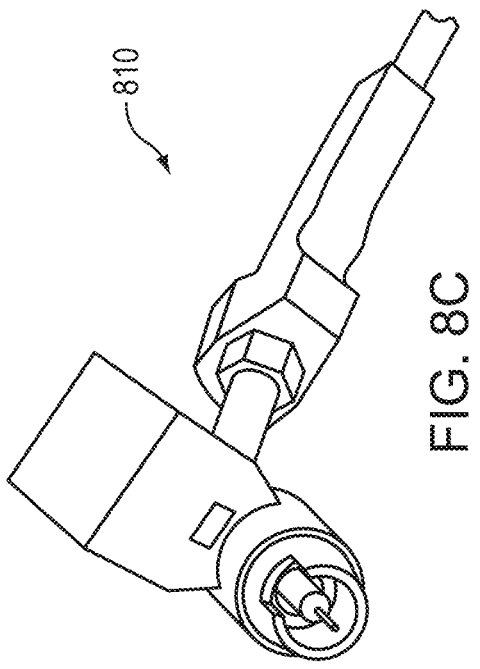
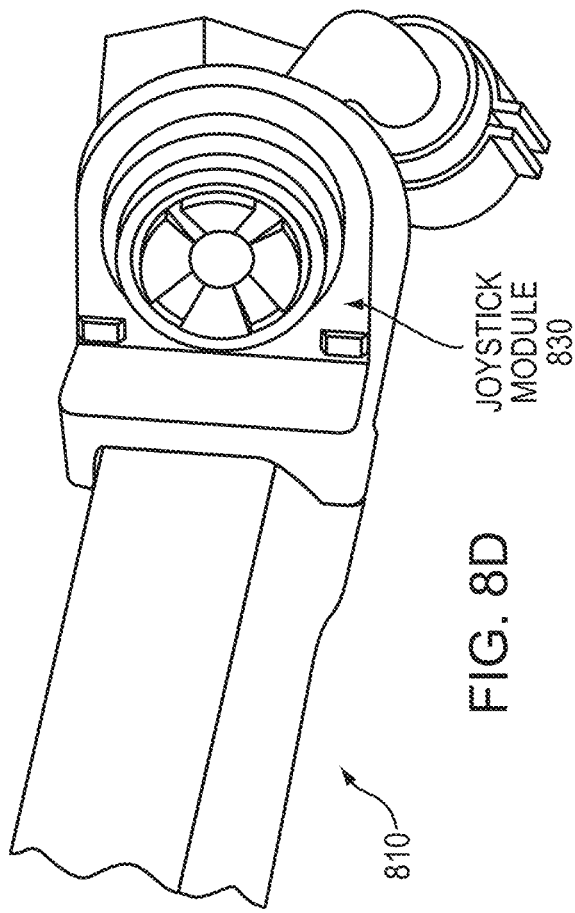
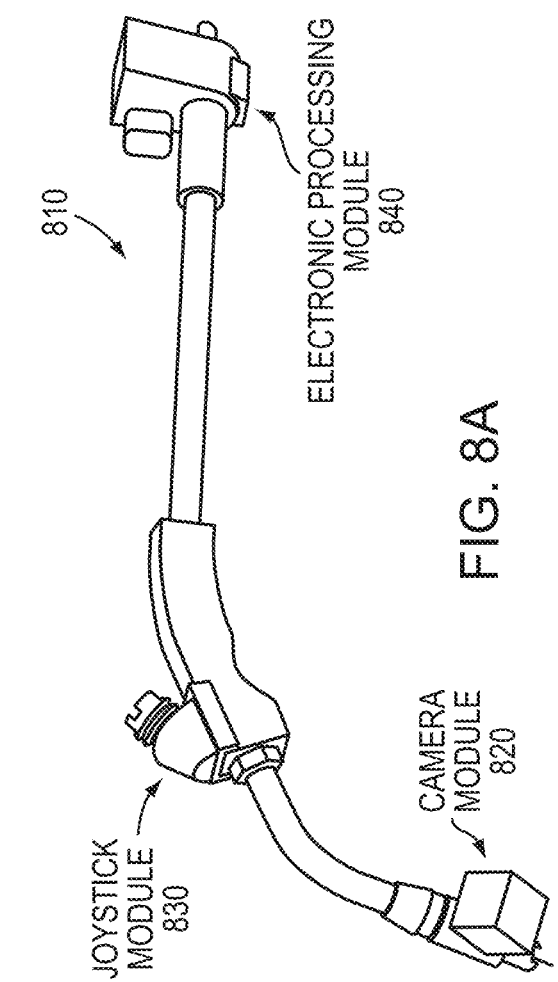
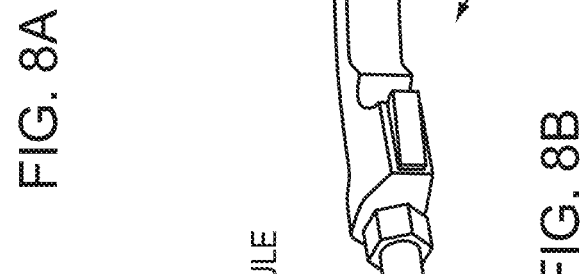

COMBINATION OF IMAGE 1 AND 2 (PSEUDO-STEREOSCOPIC)

METHOD, SYSTEM, AND APPARATUS FOR MIXED REALITY

BACKGROUND

Often training can problematic as it may be hard to instruct workers to complete certain tasks in a classroom environment.

SUMMARY

A method system an apparatus to convert an image to a pseudo-stereoscopic image comprising receiving an image through a single video source, duplicating the captured image, cropping the captured image and the duplicated image by applying an offset to the images, outputting the images to a display be displayed to a user in a manner such that user perceives depth in the images due to the applied offset and displaying the images on a stereoscopic display.

BRIEF DESCRIPTION OF THE FIGURES

FIG. 2A-2F are flow diagrams of menu layouts, example menus, and various types of selections implemented in a system, in accordance with embodiments of the current disclosure;

FIGS. 8a, 8b, 8c, and 8d are example embodiments of a welder's torch with integrated camera and joystick, in accordance with an embodiment of the current disclosure;

DETAILED DESCRIPTION

Figure 1:
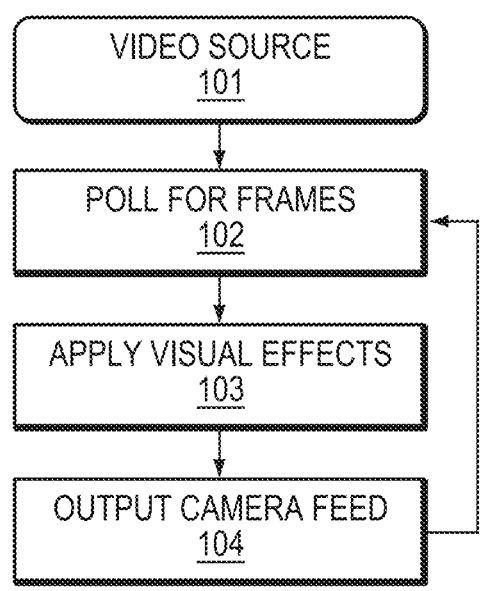
FIG. 1 illustrates a process of polling for frames and the process of preparing those images for the user, in accordance with an embodiment of the current disclosure.

In many embodiments, the current disclosure has realized that a mixed reality or virtual reality MR/VR may be beneficial in a number of environments. In some embodiments, the current disclosure may enable MR or VR may be used to help train people by providing additional information that may enable to better and more quickly understand tasks. In other embodiments, the current disclosure may enable MR or VR to provide a user with additional information. In further embodiments, the current environment may enable MR or VR to provide a user with information in a different format that the user would normally experience in reality, which may greatly simply a task.

In a particular example, MR or VR may be able to flip an image, that might otherwise present as a mirror image, to enable a user to interact with the image as if it were not a mirror image. In many embodiments, flipping a mirror image may enable a user to better interact with an environment that would require the use to otherwise mirror their actions. In some embodiments, an image might be a mirror image because, due to the location of the object to be viewed, the object would need to be viewed with a mirror.

In certain embodiments, operations in tight spaces may require using mirrors, which may be difficult due to the reverse image presented through a mirror. In other embodiments, using a mirror may be used when it is otherwise not possible to visualize a task. In many embodiments, one or more of the techniques of the current disclosure may be used when it may not be possible to visualize a task to be performed.

In some embodiments, the current disclosure may provide a method system and apparatus for viewing a two-dimensional image as though it was a stereoscopic image simulating depth and solidity. In most embodiments, stereoscopic imagery may be used to fully immerse the user. In other embodiments, stereoscopic imagery may be used so a welder may be able to see a weld up close and a weld pool is clear during a welding process. In certain embodiments, to simulate a stereoscopic effect, a user may look at a dual image through a pair of virtual reality lenses.

In some embodiments, welding may present a complex problem when confronted by a mirror welding requirement. In most embodiments, mirror welding typically required years of highly advanced training and skill to be able to perform a mirror weld. In almost all embodiments, the current disclosure may reduce the complexity of mirror welding by presenting a user or welder with an image that isn't flipped or a mirror image so that the welder may weld with what appears to be a normal unmirrored image. In some embodiments, where a subject matter expert is used to a flipped or mirror image a psudo-stereoscopic image may be presented as a mirror image in a headset. In most embodiments, where a mirror image is provided to a user who is skilled working with a mirror image, presentation of a stereoscopic image may improve a user's visualization capabilities but does not require them to re-learn a mirror process.

In certain embodiments, the current disclosure may use MR or VR to flip a mirror image for a user or enable an image that didn't need to be flipped in the first place. In many embodiments, it may be necessary to weld in environments where it may not be possible to look at what is being welded due to space requirements. Typically, it might have been necessary in some environments to weld with a mirror to view an object in a constrained space. In some embodiments, a wireless camera may be integrated with a welding torch. In certain embodiments, a wireless camera may have an auto darkening lens. In many embodiments, a torch may have a joystick to control different options of a display.

In certain embodiments, a user or welder may use a welding helmet. In many embodiments, a welding helmet may be integrated with a display. In most embodiments, a display may be a stereoscopic display. In some embodiments, a stereoscopic display may enable a single captured image to be duplicated cropped and displayed to a user in a manner that simulates a user seeing a stereoscopic image to enable depth perception. In almost all embodiments, shifting a welder's vision to a display, instead of an actual weld environment, may remove significant eyestrain from the welder and limit accidents. In almost all embodiments, using a screen may remove many of the visual hazards of welding as the screen limits the amount of light to which the welder may be exposed. In most embodiments, a welding helmet may be integrated with processing capability. In many embodiments, a processing capability may be able to take an inputted image, duplicate the image, add additional information to the image and provide the image to a display. In certain embodiments, a display attached to a welder's helmet may be opened or flipped up by a set of hinges.

In many embodiments, a welding helmet may be integrated with a Bluetooth receiver. In most embodiments, a Bluetooth receiver may be able to receive an image transmitted from a wireless camera. In some embodiments, a Bluetooth receiver may be able to receive information from such as user inputs to an input device, information about a welding torch, and other information. In many embodiments, a Bluetooth receiver may be able to pass information received wirelessly to a processing device.

In some embodiments, looking through a pair of virtual reality lenses at a stereoscopic image may immerse the welder in a welding environment, providing additional details that may not otherwise be visible. In some embodiments, what a welder sees may be replaced with the images coming off a camera at the end of a welding torch. In many embodiments, a system to create a two-dimensional image may come with unique options menu in order to control various settings such as video enhancements, data display text on screen, and key bindings. In most embodiments, video enhancements, data display test, and key bindings may help a welders complete jobs more efficiently. In some embodiments, a system may include an option for Bluetooth compatibility. In certain embodiments, a Bluetooth module may accept commands to control various parts of a system such as key presses, data display, and work instructions.

In some embodiments, the current disclosure may enable a method, apparatus and system to enhance workplace visualization using simulated stereoscopic imagery. In many embodiments, using a video stream, a system may transform frames into two slightly offset images that are displayed to the user side by side. In most embodiments, images may be offset to simulate the stereoscopic image and fully immerse the user. In some embodiments, transformed stereoscopic transformed images may have visual effects applied to them in order to enhance the viewing experience. In many embodiments, viewing a weld using the stereoscopic images and visual effects may allow welder to view a weld pool in higher detail than would be possible with a welding mask without the risk of eye damage. In some embodiments, an options menu may enable changing of various settings within a system, apply visual enhancements to the frames, or manage work instructions. In many embodiments, a Bluetooth module may also be bundled with a system for outside sources to interact with the system by controlling key presses, data display, and work instructions.

In many embodiments, a system may include a computer, such as a raspberry pi or other miniaturized computer, which may have, a processor, graphics card, Bluetooth receivers, and input/output (I/O) connections. In certain embodiments, a wireless camera feed may be streamed into a system for image manipulation. In all embodiments, a graphics card may output a stereoscopic image to a display connected to a raspberry pi or similar miniaturized computer. In most embodiments, users may use a set of virtual reality goggle lenses in order to view a stereoscopic image on a display.

In almost embodiments, a welding helmet may used to attach electrical instruments to create a system. In some embodiments, a welding helmet may be covered in leather for additional protection for a user. In many embodiments, a set of virtual reality glasses may be nested inside of a welding helmet. In some embodiments, virtual reality goggle lenses may be adjusted to a user's preference for visual clarity. In other embodiments, a raspberry pi may be mounted to a hinged visor on a welding helmet. In certain embodiments, a raspberry pi may be connected to a monitor that displays virtual images through a live camera feed.

In certain embodiments, it may be necessary to poll for frames, or individual images that make up a video stream. In many embodiments, it may be necessary to prepare frames into images for a user. In some embodiments, a system may get frames from a video source. In certain embodiments, a system may locate an image stream or video stream. In a particular embodiment a video stream may be a video clip. In another embodiment, an image stream may be an Audio Video Interleave file or AVI. In other embodiments, a webcam may be used as a video source. In further embodiments, a video source may be a any video source readable by a video buffer. In some embodiments, a video source may be readable by computer vision software.

In many embodiments, given a video source, a thread, or a separate means of processing commands on a processor without interrupting main commands running, may be created to poll for frames from a video source. In most embodiments, a separate thread may be used to poll for frames or images from a video source, so the thread does not disrupt other parts of the system, such as gating other programs or stealing resources from a common program. In most embodiments, a system may have multiple threads where one thread may poll for frames and another thread or process may edit or process frames. In many embodiments, a captured frame may be edited to create a simulated stereoscopic image; this is done using visual effects. In certain embodiments, through a user interface, formatted images may be displayed side by side to a user to create a stereoscopic image.

In many embodiments, a system may use a video source to poll for frames. In certain embodiments, a system may use polled video frames to create an image from a video source. In many embodiments, a system may use a polled image from a video buffer. In some embodiments, a polled video image may be duplicated and cropped to simulate an offset. In some embodiments, an offset may be important because it simulates an offset of human eyes when viewing a normal image in the real world. In certain embodiments, visual effects may be applied to a created image. In certain embodiments, visual effects may include changes to hue or saturation. In other embodiments, visual effects may include value changes, text on screen, distortion to the image, and or flipping of the images. In further embodiments, visual changes may include glowing; drop shadowing; and stroking of an image. In most embodiments, duplicated and edited images may be displayed to a user side-by-side. In some embodiments, displaying edited images side by side may allow a user to use lenses in conjunction with the side-by-side images to fully immerse themselves in the image. In certain embodiments, polling, editing, and displaying images may be repeated to show a series of simulated stereo images.

In many embodiments there may be different options for menu layout and various types of selections. In some embodiments, there may be instantiation of an options menu module. In some embodiments instantiation of an options menu may enable a user to open up options menu with a specified key press. In many embodiments, a user may navigate an options menu through the use of a main menu. In certain embodiments, upon selecting a category, users may be presented with options to change or to refresh their memory on a status of a specific object. In most embodiments, during initialization of an options menu, options from a configuration file may be loaded. In many embodiments, during creation of an options menu, values may be loaded from the configuration menu and set. In some embodiments, during options menu initialization, key bindings may be applied so users can navigate the options menu. In most embodiments, upon pressing an open menu button, a main menu may appear.

In many embodiments, an options menu may be shown to a user. In most embodiments, an options menu may be a navigation terminal to get from menu to menu. In certain embodiments, a main menu may have a general options section. In many embodiments, a main menu may have a key bindings section. In some embodiments, a main menu may have an image options section. In further embodiments, a main menu may have a data display options section. In certain embodiments, a main menu may have a work instruction options. In most embodiments, when a user selects a menu section from a main menu, a submenu may be shown. In almost all embodiments, when a user selects exits a submenu, changes to the submenu may be updated a saved. In most embodiments, updated options may be saved to a configuration file to load up upon startup the next time a system is turned on.

In many embodiments, selecting a menu general options may present a user with a list of options. In some embodiments options may include system controls and restore to defaults. In some embodiments, a particular option may contain controls that control a computer such as whether the user wants to power off the system or close out of the program currently running. In other embodiments, when further option is selected, a user may be able to loop through every other menus' options and restore the default value. In a particular embodiment, if a user chooses key bindings, the user may be presented with a list of key bindings that are used by the system and what they do within a system. In some embodiments, a user may select an action such as move curser up, or down. In many embodiments, once an action is selected a user may be prompted to select which key binding corresponds to the action. In some embodiments, a loop may enable the user to set a series of actions and key bindings.

In some embodiments, a user may be presented with a list of all the key bindings that are used by the system. In some embodiments, an action may first be selected such as move curser up, down, etc. In other embodiments, there may be a prompt to select which key binding to change the action to. In most embodiments, the cycle may loop itself back to begin selecting a new key binding.

In certain embodiments, if a user selections image options the user may be presented with options to change visual effects of an image. In some embodiments, some options may be used to enhance a color or brightness of an image. In many embodiments, options may include hue, saturation, and value changes. In certain embodiments, a user may be able to select where text is located on a screen. In many embodiments, it may be beneficial to have text appear close to the center of an image, so it is easier to see while viewing in virtual reality. In some embodiments, there may be options to distort an image such as adding various effects including but not limited to a barrel distortion or pincushion. In some embodiments, user added distortions may allow a user to counteract the distortion caused by the virtual reality lenses. In some embodiments, an image may need to be cropped in order to magnify the image or change an offset. In many embodiments, a user may have access to special visual effects which include, but are not limited to, flipping, glowing, drop shadowing, and stroking of an image. In some embodiments, enhancements may help a user feel more comfortable with how they are seeing the image or to help with certain types of visualizations.

In some embodiments, based on a selection of data display options, a user may be shown a list of data display options, which are certain values of text that get written to the screen. In most embodiment, a user may be able to change a position of text on a screen, which may allow a user to feel more comfortable with where the text will appear. In almost all embodiments, a user may change a color of text. In many embodiments, color of text may help text stand out against different background colors and may help make the user more comfortable with a system. In most embodiments, a user may choose between imperial units or the metric system. In many embodiments, a user may be given the option to toggle each data display on and off.

In some embodiments, a work menu may have different options. In a particular embodiment, a work menu may have to instructions to add and remove work instructions. In certain embodiments if a user selects to add a work instruction, the work instruction may be marked as complete. In certain embodiments, a work instruction may get added to a list of complete work instructions. In some embodiments, a user may select a complete work instruction and remove it. In certain embodiments, this may bring a work instruction back to a "to be completed" list. In many embodiments, a "to be completed" list may be a way to help a user keep track of work and tasking while geared up in the virtual reality headset.

In many embodiments, a Bluetooth module may establish a connection and receives and/or interoperates commands. In many embodiments a Bluetooth module may be instantiated. In certain embodiments, a Bluetooth connection may be ready to receive a connection once it is started. In some embodiments, a Bluetooth connection may listen for data. In some embodiments data may be in a form of a command, which may correspond to data display, work instructions, or controls. In certain embodiments, if a control command is called, it may trigger a button press call within a system. In other embodiments, if a work instruction command is called, it may add or removes a work instruction from a menu system. In further embodiments, if a data display command is called, it may update a data display text on screen.

In many embodiments, a Bluetooth module may have an instantiation routine. In some embodiments, during instantiation, a module may look for and establish a connection. In a particular embodiment, a Bluetooth device may use a Radio Frequency Communication protocol. In other embodiments, similar connections may be made with other types of Bluetooth connection protocols. In some embodiments, with a connection a thread may be created to handle a connection for a Bluetooth module. In many embodiments, a Bluetooth module may continually search for new connections. In almost all embodiments, a Bluetooth module may be able to handle multiple connections.

In certain embodiments, given a connection, a system may listen for any string sent through the connection. In some embodiments, a thread may monitor a connection for text sent over the connection. In many embodiments, if a command is received, a thread may determine what the command is. In certain embodiments a command may be a data display, work instruction, or control command.

In some embodiments, if the command is a work command a system may read what button should be called to be pressed. In some embodiments, a work command may be used to type out a message, control an options menu, or exiting a program. In other embodiments, if a data display command is called, a system may look for two arguments: what data display should be updated and to what should the value be updated. In many embodiments, if a data display command is used, a system may update a proper value if command was issued with a correct argument set. In many embodiments, if a work instruction command is called, it may have two arguments. In some embodiments, a work command may have an action (add/remove) and a work instruction, which may be to what the action is being done. In almost all embodiments, if arguments for a work command are correct, a system may either add or remove the work instruction from the options menu.

Refer now to the example embodiment of FIG. 1, which illustrates a process of polling for frames and the process of preparing those images for a user. A video source is defined by finding an image source stream (step 101). Using the video source, the system polls for frames by waiting for a new image to be produced from the video source (step 102). The system will apply visual effects on capture data by duplicating the polled image from the video buffer system cropping it in such a way to simulate an offset. The duplicated images are then displayed to a user by outputted the camera feed (step 104). In certain embodiments, other visual effects may be applied to an image which consist of, but are not limited to hue; saturation; and value changes, text on screen, distortion to the image, and flipping; glowing; drop shadowing; and stroking of the image.

Refer now to the example embodiments of FIGS. 2A-2F, which illustrate diagrams of an options menu layout, example menus, and various types of selections implemented in the menus.

Refer now to the example embodiment of FIG. 2A, which illustrates the main options menu and possible menus that one can open. The options menu is instantiated, and all configuration files are created if not already created; the options menu's values are updated from the configuration files including the key bindings (step 201). Once the options menu button is pressed to open it, the options menu is shown to the user with the five major components of the system, each of which will open up a new options menu: general options, key bindings, image options, data display options, and work instructions (step 202). Image 260 represents an example embodiment of the Main menu and its sub menus.

Refer now to the example embodiment of FIG. 2B, which illustrates the general options in its entirety. Upon selecting the menu general options (step 203), the user is shown the options which include system controls and restore to defaults. The system controls contain options that directly control the computer, whether the user wants to power off the system or close out of the program currently running (step 210). Restore to defaults, when selected, will loop through every other menus' options, and restore the default value (step 211). Image 262 represents an example embodiment of the Main controls and its sub menus.

Refer now to the example embodiment of FIG. 2C, which illustrates the key binding options and process. If the user decides to choose key bindings (step 204), they are be presented with a list of all the key bindings that are used by the system and what they do within the system but first need to select an action such as move curser up, down, etc. (step 220). The user will be prompted to select which key binding they would like to change the action to (step 221). After, the cycle loops itself back to step 220. Image 264 represents an example embodiment of the Main controls and its sub menus.

Figure 2D:
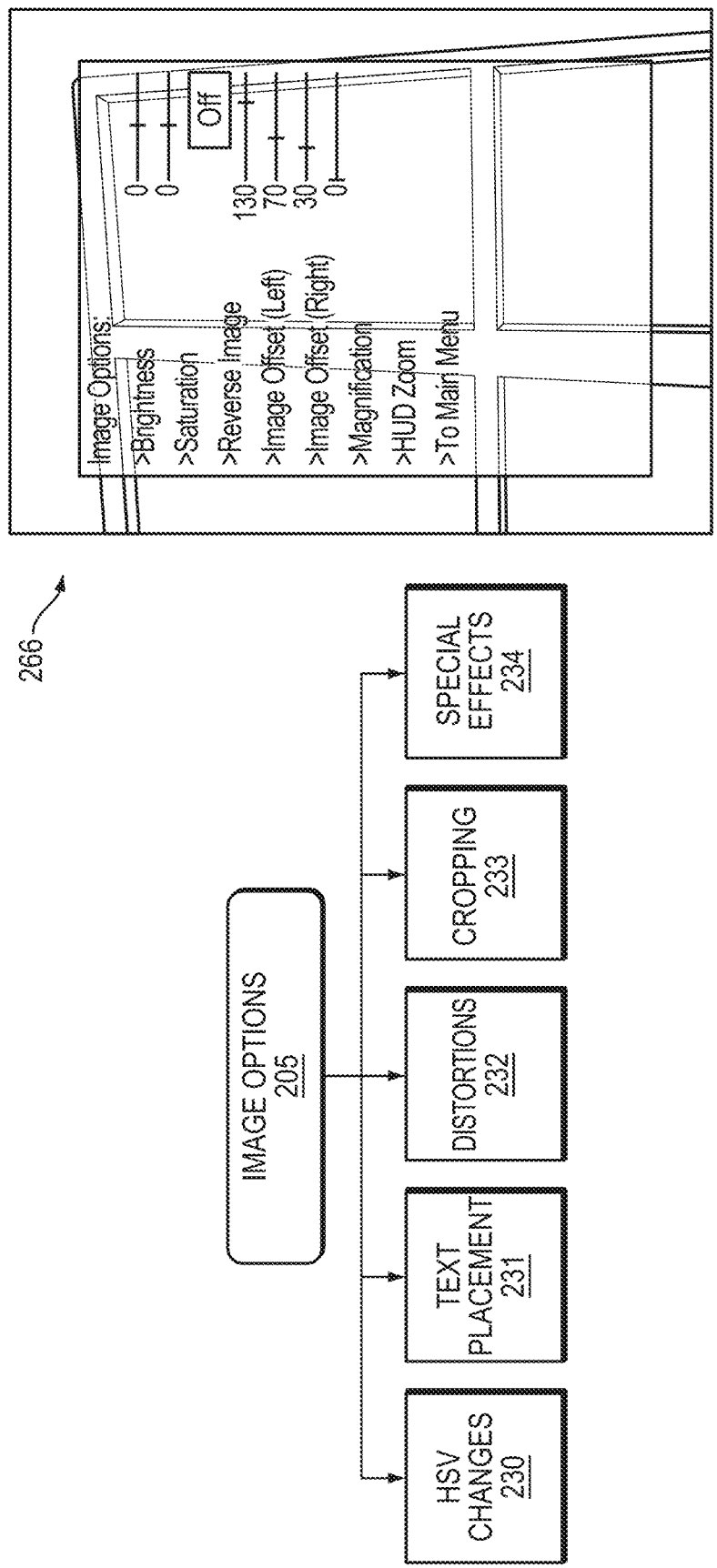

Refer now to the example embodiments of FIG. 2D, which illustrates the image options and each visual enhancement option. Upon selecting image options, there are various options to change the visual effects of the image (step 205). The first three options are the hue, saturation, and value changes to the image. Such options should be used to enhance the color or the brightness of an image (step 230). Users can select where the text goes on the screen (step 231). The user may also choose to distort the image in some ways such as adding various distortive effects (step 232). The image may also need to be cropped in order to magnify the image or change the offset (step 233). There are also other special visual effects (step 234). In some embodiments, these visual effects include flipping, glowing, drop shadowing, and stroking of the image. Image 266 represents an example embodiment of the Image options and its sub menus.

Figure 2E:
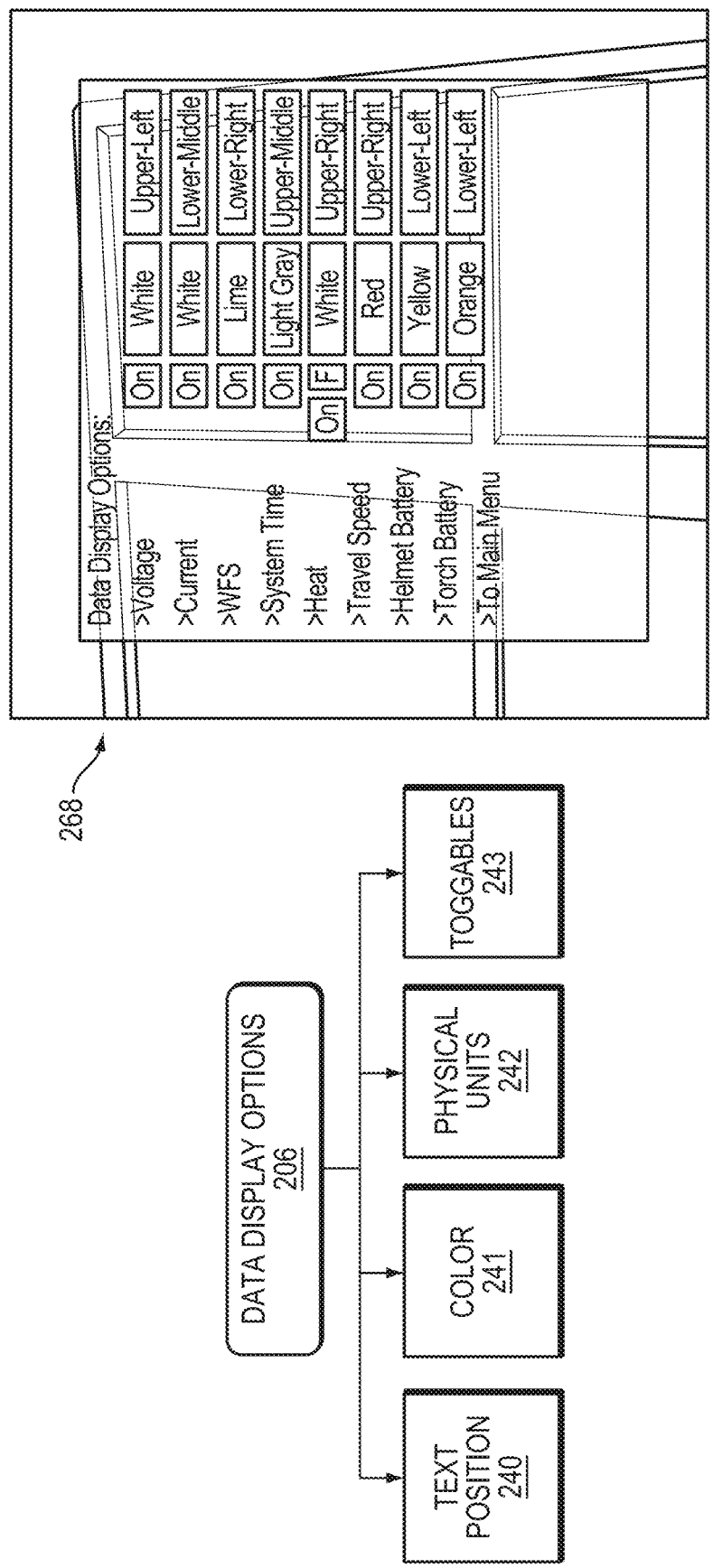

Refer now to the example embodiments of FIG. 2E, which illustrates the data display options and the various user interface display variations. Upon selecting data display options, the user will be presented with a list of data display options which are certain values of text that get written to the screen (step 206). The user will be able to change the position of the text on the screen (step 240). The user can change the color of the text to their preference (step 241). Depending on whether the user uses imperial units or the metric system, they can change the physical units the values are displayed in (step 242). The user can toggle each data display on and off (step 243). Image 268 represents an example embodiment of the data display option menu and its sub menus.

Refer now to example embodiments of FIG. 2F, which illustrates the process of adding and removing work instructions. This menu has two distinct features to add and remove work instructions (step 207). When the user selects to add a work instruction, it marks that work instruction as complete to the system (step 250). After, the user can select a complete work instruction and remove it (step 251). Image 270 represents an example embodiment of the work instructions menu and its sub menus.

Figure 3:
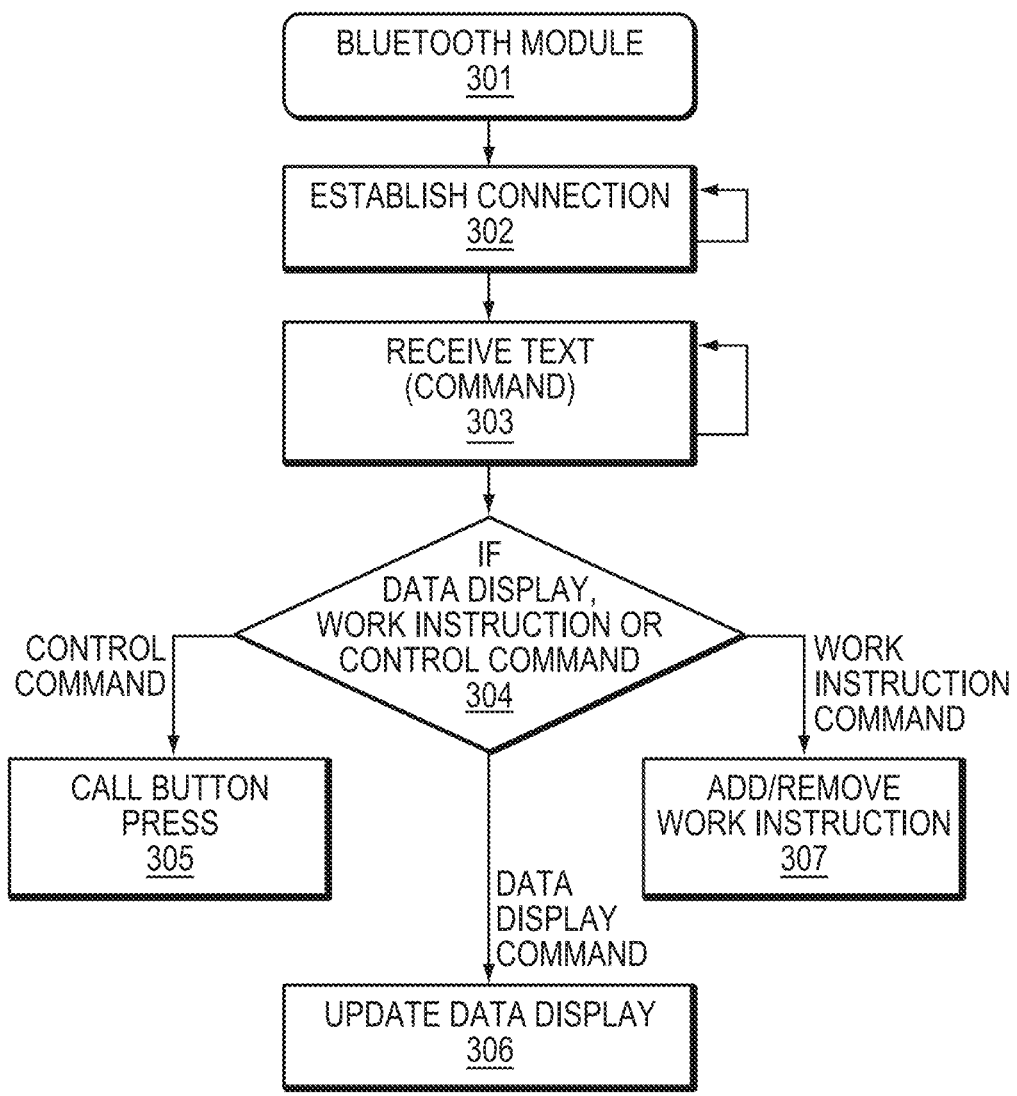
FIG. 3 is a flow diagram of how a Bluetooth module establishes a connection and receives/interoperates commands, in accordance with an embodiment of the current disclosure.

Refer now to example embodiments of FIG. 3, which illustrates the process of the Bluetooth module establishing a connection and processing a command. The Bluetooth module is first instantiated (step 301). It becomes ready to receive a connection (step 302). After a connection is received, it listens for text which will be in the form of a command (step 303). The command center must make a decision of what the command will be used for (step 304). If a control command is called, it triggers a button press call within the system (step 305). If a work instruction command is called, it either adds or removes a work instruction from the menu system (step 307). Finally, if a data display command is called, it updates the data display text on screen (step 306).

Figure 4:
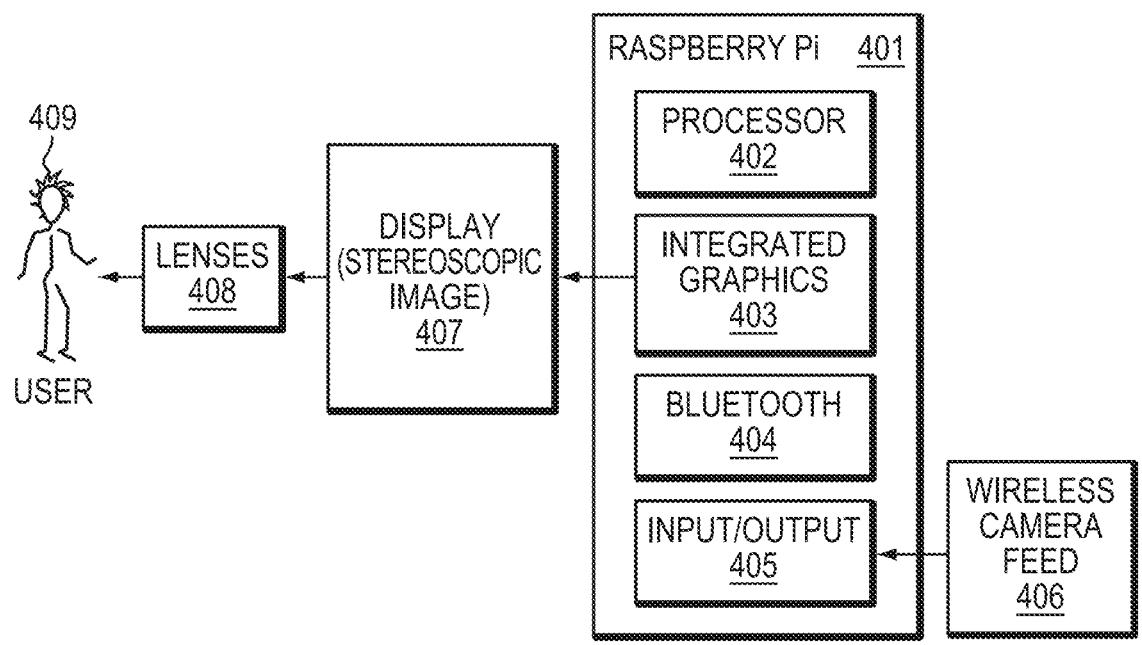
FIG. 4 illustrates sample hardware of a system and how a user may to interact with a display, in accordance with an embodiment of the current disclosure.

Refer now to the example embodiments of FIG. 4, which details a raspberry pi system as well as how the user can interact with said system. The raspberry pi system itself contains various components that are important to the success of this system (step 401). The processor does management of the various threads that are running and processing the mathematical or procedural command that the system must execute (step 402). The integrated graphics are used to process vector mathematics to draw frames onto a display to produce a coherent image (step 403). Bluetooth is also important to the system because it accepts commands for the program in order to control various parts of the apparatus (step 404). The input and output part of the system is used in this instance to pull frames off the wireless camera feed dongle (step 405). To get video from the wireless camera, one must use the wireless camera feed dongle to transmit that data to the raspberry pi (step 406). The display outputs a stereoscopic image for the user to view as though the image was their actual eyesight (step 407). The lenses in the diagram are used for viewing the stereoscopic image provided by the display; it makes the image more immersive for the user (step 408). The user will then put on the lenses, display, and raspberry pi in order to immerse themselves in the wireless camera feed that is processed and then displayed to the user (step 409).

Figure 5:
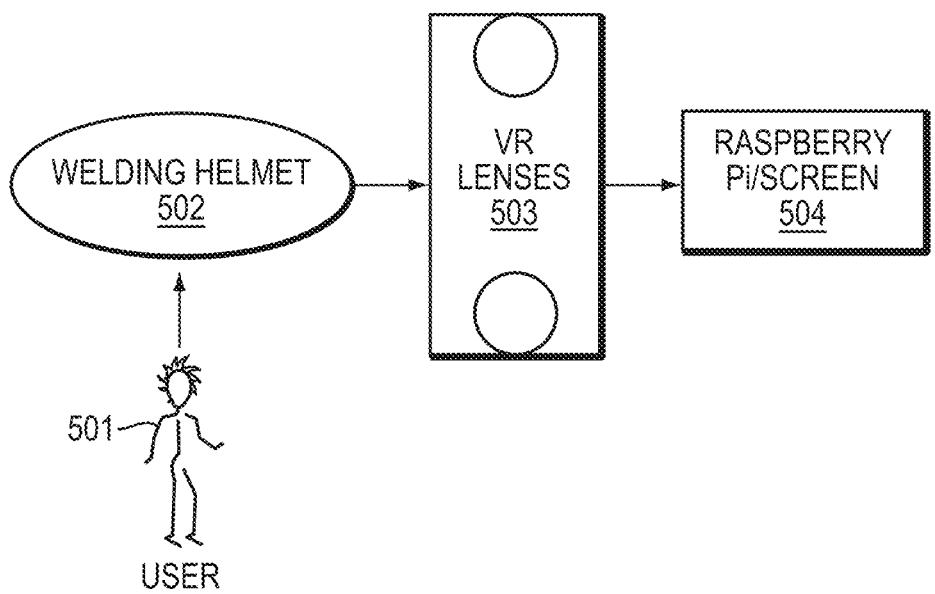
FIG. 5 illustrates a sample set-up of the hardware and how the different components fit together as a complete unit, in accordance with an embodiment of the current disclosure.

Refer now to the example embodiments of FIG. 5, which illustrates the layout of a completed unit. The user would put their head (step 501) into the welding helmet (step 502) to immerse themselves into the unit. Once achieved, the user can then adjust the fitment of the helmet to their head to optimize the alignment of which the virtual reality goggles fits to the front of the users face (step 503). The user can then look through the virtual reality goggles to see the raspberry pi/display that is attached to the hinged visor on the outside of the welding helmet (step 504).

Figure 6A:
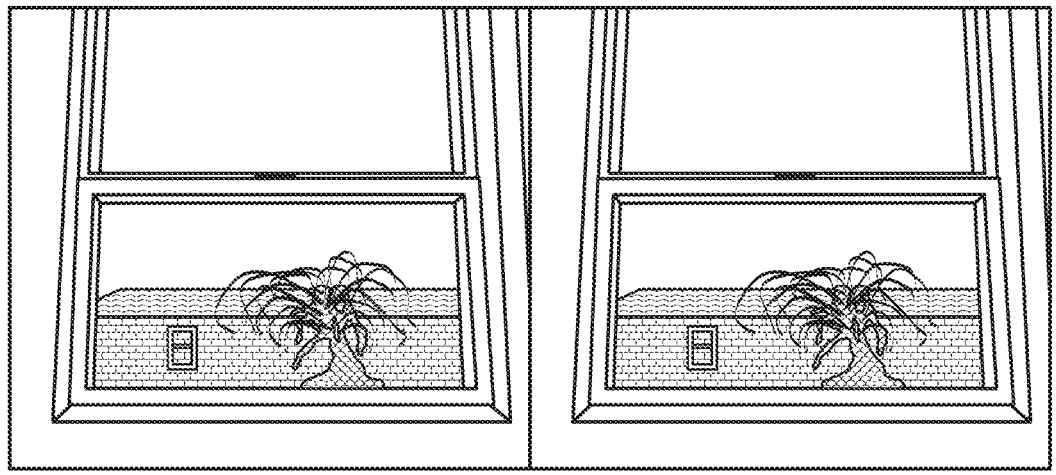
FIGS. 6a and 6b are example embodiments of a stereoscopic image and how such an image is perceived by a viewer, in accordance with an embodiment of the current disclosure.
Figure 6B:
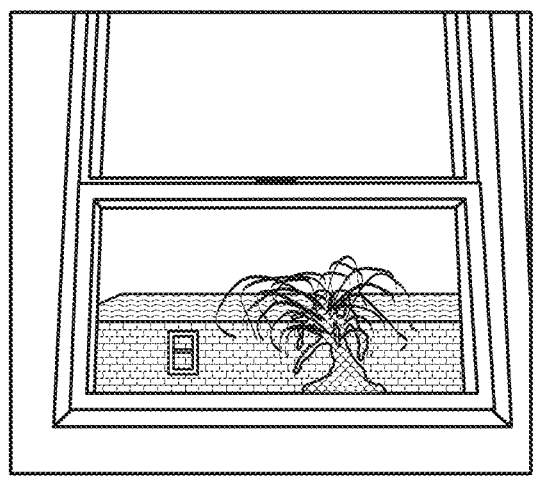

Refer now to the example embodiments of FIGS. 6a and 6b, which illustrates a sample pseudo stereoscopic image and how it is perceived. FIG. 6a presents a sample stereoscopic image that can be presented to a user in a headset. Due to the proximity of the image to each eye of the headset, the user perceives the image of 6a as the image of 6b. In perceiving the image of 6b, dues to the cropping of an original image, the user is able to "perceive" depth in the single image of 6b.

Figure 7B:
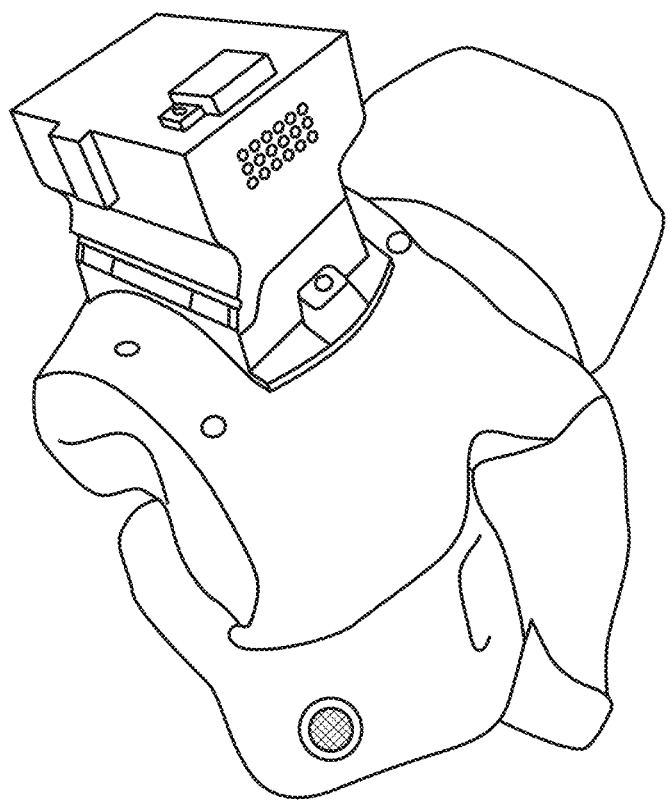
FIGS. 7a and 7b are example embodiments of a welder's helmet, in accordance with an embodiment of the current disclosure.
Figure 7A:
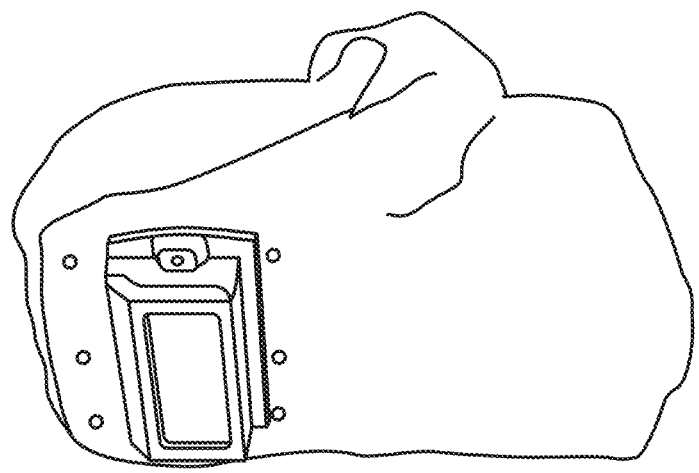

Refer now to the example embodiments of FIGS. 7a and 7b, which illustrate different views of a welding helmet with virtual display. The example embodiments of 7a and 7b, show a welding helmet 710 in different views. Welding helmet 710 is made out of leather. Welding helmet 710 has display device 720. Display device 720 has a display, a raspberry pi as processing capability, a Bluetooth receiver, and a display for the user.

Refer now to the example embodiments of FIGS. 8a, 8b, 8c, and 8d, which illustrate a sample embodiment of a welding torch with a wireless camera, auto darkening lens, and wireless joystick. Torch 810 has camera module 820, with camera and auto darkening lens, joystick module 830, and electronic processing module 840. Camera module 820 is enabled to take images of what a welder would see and wireless transmit these images to a receiver. Joystick module 830 is enabled to take input from a user holding torch 810 and manipulate display data transmitted by camera module and also manipulate overlay data presented to a user.

Figure 9A:
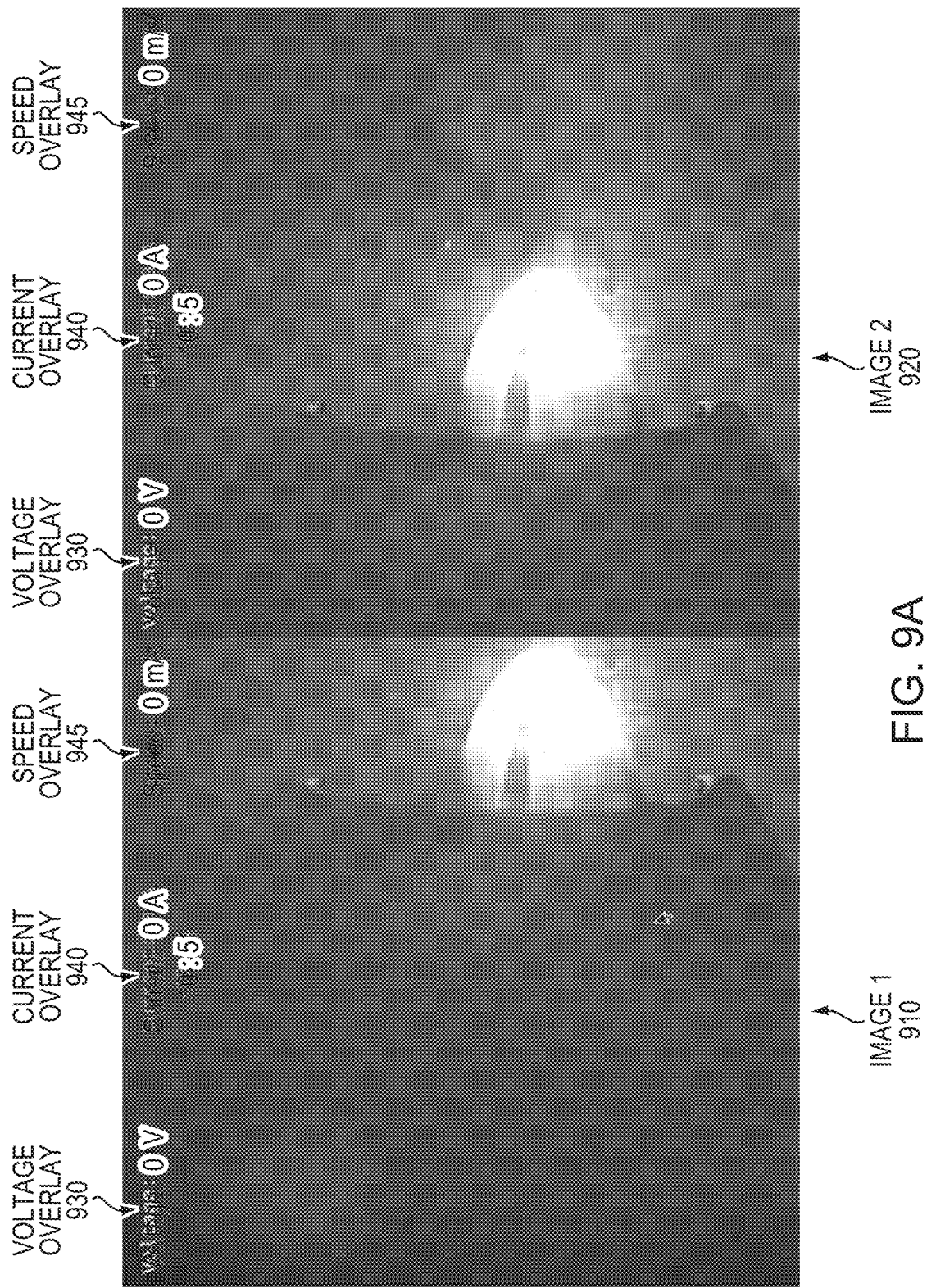
FIGS. 9a and 9b are example illustrations of a pseudo stereoscopic image created from an image captured by a camera in a welding environment, in accordance with an embodiment of the current disclosure.
Figure 9B:

Refer now to the example embodiments of FIGS. 9a and 9b, which illustrate a display shown on a display to a welder. Image 1 910 represents an image presented to a left eye of a welder and image 2 920 represents an image presented to a right eye of a welder. Voltage overlay 930, which appears on both displays, displays a sample voltage of a welding torch. Current overlay 940 represents the present current. Speed overlay 945 represents the current speed. Merged image 950 in FIG. 9b represents what the user sees when looking through the VR lenses with both eyes at the pseudo stereoscopic image.

Figure 10:
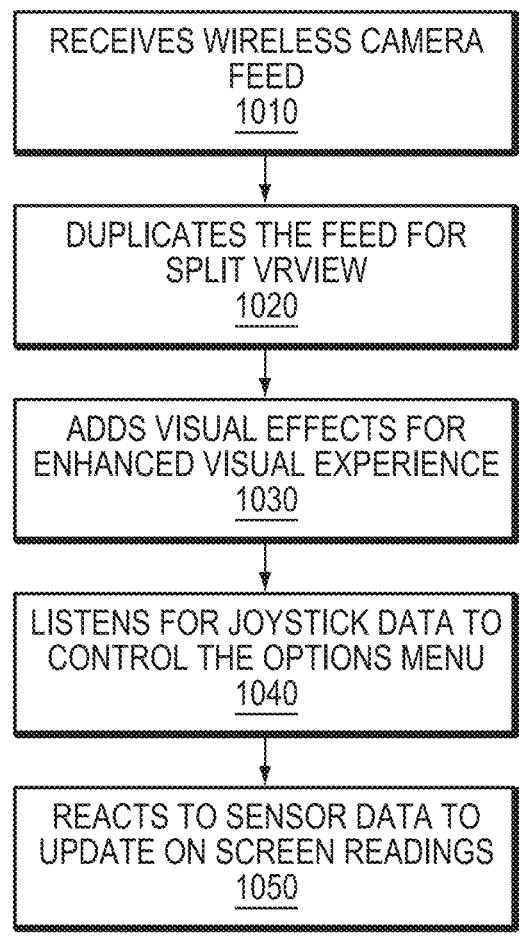
FIG. 10 is an example embodiment of a method for creating a stereoscopic image from a single image, in accordance with an embodiment of the current disclosure.

Refer now to the example embodiments of FIGS. 4, 5 and 10, which illustrates a sample method for welding using VR/MR. Welding helmet 502 receives a wireless camera feed 406, which is sent to raspberry Pi 410. (step 1010). Processing power 402 of raspberry Pi 401 of the welding helmet duplicates the image for display to a user (step 1020). Processing power 402 of the welding helmet 502 adds visual effects for an enhanced visual experience (1030). Welding helmet listens for joystick data to control an options menu of the helmet (step 1030). Upon receiving additional camera data or sensor data, welding helmet updates the information displayed to a user (step 1050).

Figure 11:
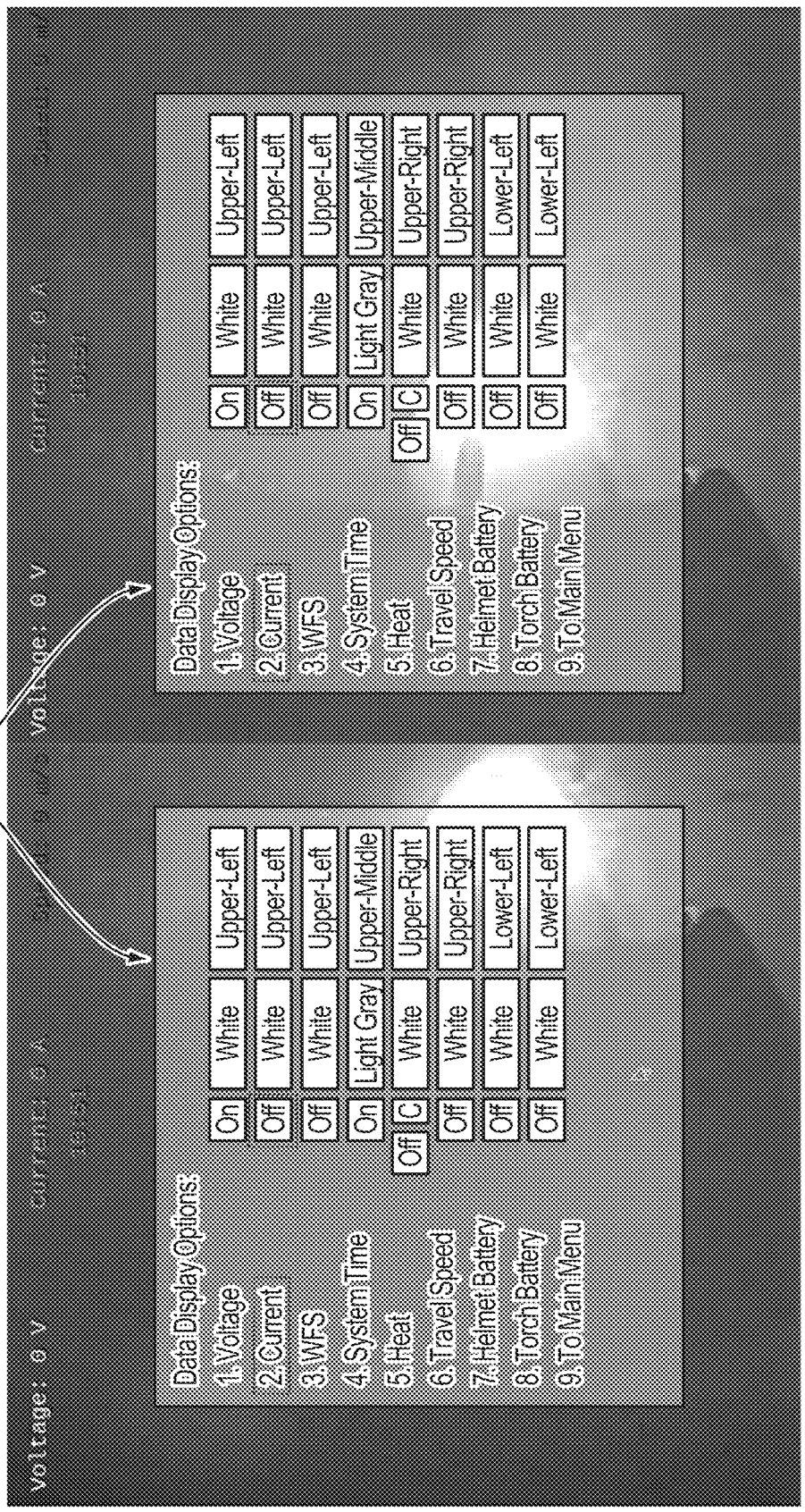
FIG. 11 is an example embodiment of a menu overlaid on a stereoscopic image, in accordance with an embodiment of the current disclosure.

Refer now to the example embodiment of FIG. 11, which illustrates a menu overlaid on a stereoscopic image. Sample Menu overlayed on displayed image 1110 is overlayed on image 1105.

In some embodiments, one or more of the embodiments described herein may be stored on a computer readable medium. In certain embodiments, a computer readable medium may be one or more memories, one or more hard drives, one or more flash drives, one or more compact disk drives, or any other type of computer readable medium. In certain embodiments, one or more of the embodiments described herein may be embodied in a computer program product that may enable a processor to execute the embodiments. In many embodiments, one or more of the embodiments described herein may be executed on at least a portion of a processor.

In most embodiments, a processor may be a physical or virtual processor. In other embodiments, a virtual processor may be spread across one or more portions of one or more physical processors. In other embodiments, one or more of the embodiments stored on a computer readable medium may be loaded into a processor and executed.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A method to convert an image to a pseudo-stereoscopic image comprising:

receiving an image through a video source on a welding torch as a captured image;

duplicating the captured image;

cropping the captured image and the duplicated image by applying an offset to the images;

outputting the images to a display be displayed to a user in a manner such that user perceives depth in the images due to the applied offset;

displaying the images on a stereoscopic display; and enabling a user to manipulate the images on the stereoscopic display using a joystick.

2. The method of claim 1 further comprising:

overlaying text on the captured image; wherein the text corresponds to environmental information relating to an environment captured by the video source.

3. The method of claim 2 further comprising:

applying enhancements to the image.

4. The method of claim 2 wherein the image is of a welding environment as captured by a camera on a welding torch; wherein the image has been processed to enhance the image for human vision.

5. The method of claim 4 wherein the stereoscopic display is located in a welder's helmet.

6. The method of claim 1 wherein image is a near real time display of a video images.

7. An apparatus comprising:

a wireless receiver;

a processor;

a graphical processing unit;

memory;

a video output;

a stereoscopic display;

a joystick enabling a user to manipulate display data transmitted from a welding torch; and logic; wherein the logic is enabled to:

receive an image transmitted from the welding torch from the wireless receiver;

duplicate the image by the processor to create a duplicated image;

crop the image by the processor;

crop the duplicated image by the processor;

send the image and the duplicated image to a stereoscopic display;

enable the image and duplicated image to be viewed as a stereoscopic image on the stereoscopic display enabling a user viewing the image to perceive depth in the image and duplicated image.

8. The apparatus of claim 7 wherein the image received is a capture of a welding environment as captured by a camera on the welding torch.

9. The apparatus of claim 8 wherein the apparatus further comprises a welding helmet.

10. The apparatus of claim 9 wherein the outside of the welding helmet is made of leather.

11. The apparatus of claim 9 wherein the logic is further enabled to:

mirroring the image to create a mirrored image; and mirror the duplicate image to create a duplicate mirrored image; and wherein the enabling the display of the mirror image and duplicated images as a stereoscopic image displays the mirrored image and the duplicated mirror image.

12. The apparatus of claim 8 wherein the image represents an auto darkened image; wherein the image is auto darkened by the graphical processing unit.

13. The apparatus of claim 7 wherein the received image is captured by a camera mounted on a welding torch.

14. The apparatus in claim 7 further comprising:

a welding helmet;

virtual reality lenses;

hinges; and a casing.

15. The apparatus of claim 14 wherein the wireless receiver is a Bluetooth receiver.

16. The apparatus of claim 7 where in the graphical processing unit is enabled to process vector mathematics to draw frames onto the stereoscopic display to produce a coherent image.

17. The apparatus of claim 7 wherein the graphical processing unit enables a user to crop the image received from the welding torch.

18. The apparatus of claim 7 further comprising a joystick enabling a user to manipulate overlayed data presented to a user.

19. The apparatus of claim 7 wherein overlay data is enabled to be manipulated by a user comprises a current overlay, a speed overlay, and a voltage overlay.

* * * * *